(12) United States Patent
Mircea et al.

(10) Patent No.: US 9,093,122 B1
(45) Date of Patent: Jul. 28, 2015

(54) SYSTEMS AND METHODS FOR IMPROVING ACCURACY OF TEST MEASUREMENTS INVOLVING AGGRESSOR TRACKS WRITTEN TO DISKS OF HARD DISK DRIVES

(71) Applicant: WD Media, LLC., San Jose, CA (US)

(72) Inventors: Dragos I. Mircea, San Jose, CA (US); Steven E. Lambert, San Jose, CA (US); Andreas Moser, San Jose, CA (US); Harold H. Gee, San Jose, CA (US); Douglas N. Bartholomew, Milpitas, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 13/925,734

(22) Filed: Jun. 24, 2013

Related U.S. Application Data

(60) Provisional application No. 61/809,231, filed on Apr. 5, 2013.

(51) Int. Cl.
  *G11B 27/36* (2006.01)
  *G11B 5/012* (2006.01)
  *G11B 20/10* (2006.01)

(52) U.S. Cl.
  CPC .............. *G11B 27/36* (2013.01); *G11B 5/012* (2013.01); *G11B 20/10305* (2013.01); *G11B 20/10314* (2013.01); *G11B 2220/2516* (2013.01)

(58) Field of Classification Search
  None
  See application file for complete search history.

(56) References Cited

U.S. PATENT DOCUMENTS

| | | | |
|---|---|---|---|
| 4,513,333 A * | 4/1985 | Young et al. | ............... 360/77.02 |
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |

(Continued)

OTHER PUBLICATIONS

U.S. Appl. No. 13/115,307, filed May 25, 2011, to Andreas Moser et al., 39 pages.

*Primary Examiner* — Dismery Mercedes

(57) ABSTRACT

Systems and methods for improving the accuracy of test measurements involving aggressor tracks written to the disks are provided. One such method involves erasing a circumferential band of a disk, writing a central track on the circumferential band, measuring and storing a first track profile of the central track, writing an aggressor track on each side of the central track at a preselected aggressor track offset from the central track, measuring and storing a track profile of the aggressor tracks at the preselected aggressor track offset, measuring and storing a second track profile of the central track, performing the prior actions exactly n times where n is greater than or equal to 1, determining an estimated distance between the aggressor tracks based on the respective track profiles, determining a selected measurement using the estimated distance between the aggressor tracks, and the first and second track profiles of the central track.

32 Claims, 7 Drawing Sheets

(56) References Cited

U.S. PATENT DOCUMENTS

| | | | |
|---|---|---|---|
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,265,868 B1 * | 7/2001 | Richter | 324/212 |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,650,491 B2 * | 11/2003 | Suzuki et al. | 360/31 |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,801,377 B2 * | 10/2004 | Kasajima et al. | 360/31 |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,088,535 B2 * | 8/2006 | Kim et al. | 360/53 |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,457,075 B2 * | 11/2008 | Liu et al. | 360/77.04 |
| 7,471,484 B2 | 12/2008 | Wachenschwanz et al. |
| 7,498,062 B2 | 3/2009 | Calcaterra et al. |
| 7,529,050 B2 * | 5/2009 | Shen et al. | 360/31 |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,639,447 B1 | 12/2009 | Yu et al. |
| 7,656,615 B2 | 2/2010 | Wachenschwanz et al. |
| 7,663,835 B1 | 2/2010 | Yu et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,768,729 B2 * | 8/2010 | Moser et al. | 360/31 |
| 7,833,639 B2 | 11/2010 | Sonobe et al. |
| 7,833,641 B2 | 11/2010 | Tomiyasu et al. |
| 7,843,658 B2 * | 11/2010 | Kiyono | 360/31 |
| 7,903,366 B2 * | 3/2011 | Michinaga | 360/77.02 |
| 7,907,361 B2 * | 3/2011 | Deng et al. | 360/31 |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,982,989 B1 * | 7/2011 | Shi et al. | 360/31 |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 * | 2/2012 | Nichols et al. | 360/31 |
| 8,125,724 B1 | 2/2012 | Nichols et al. |

(56) References Cited

U.S. PATENT DOCUMENTS

| | | |
|---|---|---|
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,189,286 B1 | 5/2012 | Chen et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B1 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,441,750 B1 * | 5/2013 | Nangare et al. .................. 360/39 |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,576,507 B2 * | 11/2013 | Rub .................. 360/55 |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,625,224 B1 * | 1/2014 | Lin et al. .................. 360/55 |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,495 B1 | 6/2014 | Chen et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 8,837,065 B1 * | 9/2014 | Mircea et al. .................. 360/31 |
| 2002/0060883 A1 | 5/2002 | Suzuki |
| 2003/0022024 A1 | 1/2003 | Wachenschwanz |
| 2003/0072097 A1 * | 4/2003 | Li et al. .................. 360/31 |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0062550 A1 * | 3/2008 | Lu .................. 360/31 |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |

(56) References Cited

U.S. PATENT DOCUMENTS

| | | |
|---|---|---|
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0300327 A1 | 11/2012 | Moser et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Landdell et al. |
| 2014/0234666 A1 | 8/2014 | Knigge et al. |

\* cited by examiner

SYSTEMS AND METHODS FOR IMPROVING ACCURACY OF TEST MEASUREMENTS INVOLVING AGGRESSOR TRACKS WRITTEN TO DISKS OF HARD DISK DRIVES

CROSS-REFERENCE TO RELATED APPLICATION(S)

This application claims priority to and the benefit of U.S. Provisional Application No. 61/809,231, filed on Apr. 5, 2013, entitled, "METHODS FOR IMPROVING THE ACCURACY OF SPINSTAND MEASUREMENTS INVOLVING AGGRESSOR WRITES", the entire content of which is incorporated herein by reference.

FIELD

The present invention relates generally to measurements of disks of a hard disk drive (HDD), and more specifically to systems and methods for improving the accuracy of test measurements involving aggressor tracks written to the disks.

BACKGROUND

Spin stand testing systems (spinstands) are used for multiple purposes with respect to HDD disks, including disk characterization, testing, and development. In order to perform such operations, the systems need to provide accurate and precise positioning of read-write heads at various track offsets for the purposes of reading and writing to disks. Additionally, though most measurements on a spinstand write at offset 0, certain measurements can also involve accurate and precise positioning of the head at off-track positions for writing. Accordingly, positioning of a head for spinstands is facilitated by using a servo in combination with servo marks (also known as "servo patterns") in a closed-loop system. The servo marks are written in small sectors on each disk and are used to accurately position the head at different read or write offsets.

Unfortunately, the quality of the servo patterns can greatly affect the repeatability of some essential measured results from spinstands. In general, the head positioning of a conventional servo in a spinstand (e.g., from Guzik Technical Enterprises of Mountain View, Calif.) varies over a range of read or write offsets and is not repeatable from servo-to-servo write. Furthermore, though approaches to improve head positioning accuracy have been developed (e.g., Guzik Servo Improvement Package), these solutions can suffer from drawbacks such as mechanical limitations that limit accuracy and a significant increase in operation time of the spinstand.

Many recording measurements involving a spinstand use a sequence like (1) write a central track, (2) write additional "aggressor" tracks at off track locations, and (3) assess how much the central track has changed. A servo pattern written on the disk before a sequence of tests is used to position the head at the desired radial location. However, this servo pattern is not perfect. There are variations from one writing of the servo to the next. In addition, the servo system may have a minimum step size which limits where the head can be positioned. Both of these problems degrade the accuracy for writing the "aggressor" tracks at precisely the desired location.

DETAILED DESCRIPTION

Embodiments of systems and methods described herein can substantially improve the accuracy of measurements that involve aggressor track writes in two ways. First, the systems and methods described herein can measure the actual location where the aggressor tracks were written. Present measurements just request the desired location and assume it has been achieved accurately. Using the techniques disclosed here one can determine precisely where these tracks were written, not just where they were intended to be written. Second, in the systems and methods described herein, the aggressors tracks can be written at several off-track locations, both closer and further away than desired from the central track. This gives data over a range of aggressor track locations which can be interpolated to the desired aggressor track location.

In several instances, the systems and methods are described herein in relation to a squeeze measurement. However, the same concepts can be applied to other measurements that involve off-track aggressor track writing such as magnetic track width measurements (MTW), signal to noise measurements (e.g., wsSNRfinal), error margin measurements (e.g., EMfinal), shingled error margin measurements (ShEM), and other suitable measurements.

Figure 1:
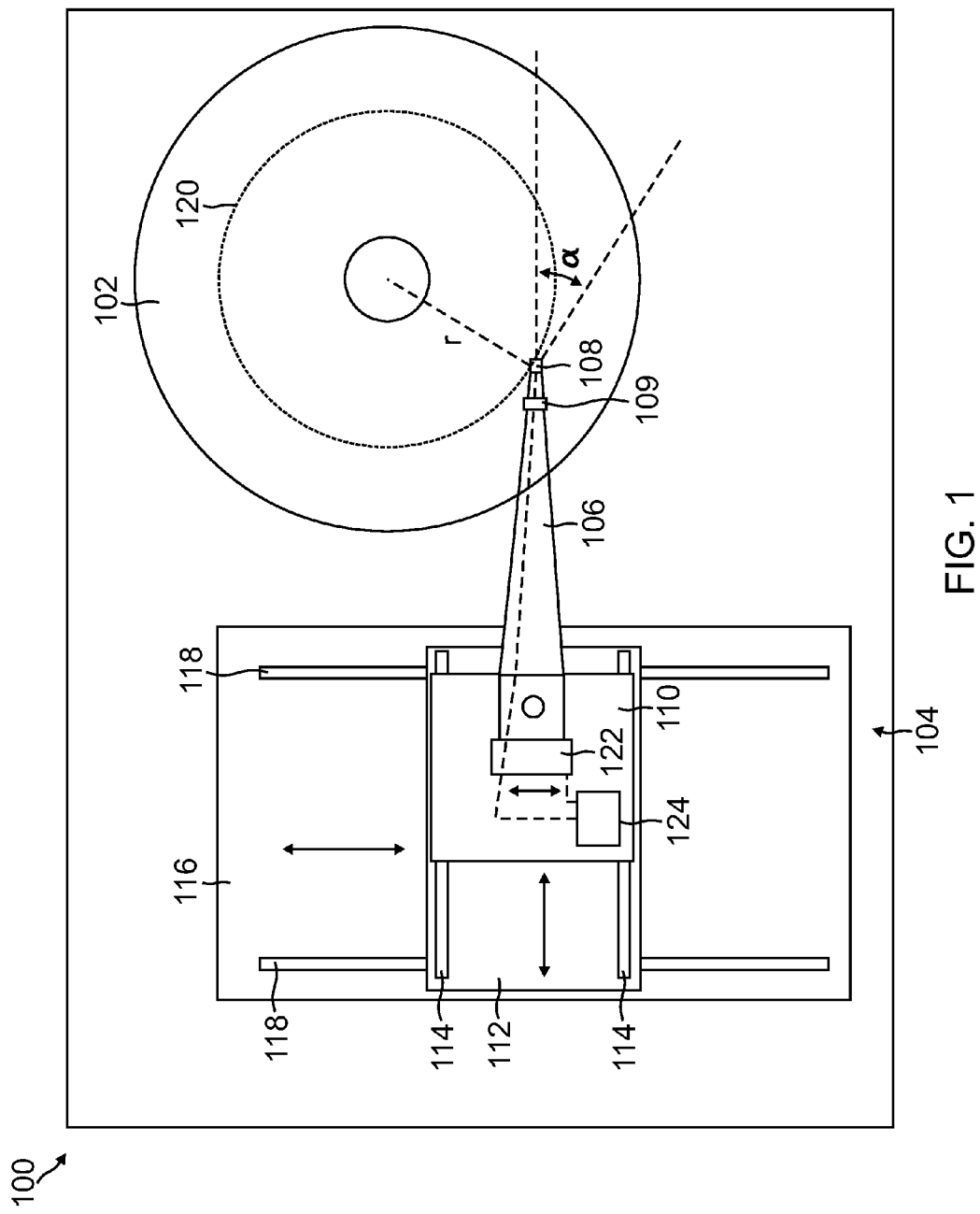
FIG. 1 is a top schematic view of a spin stand testing system configured to obtain accurate test measurements involving aggressor tracks written on a disk in accordance with one embodiment of the invention.

FIG. 1 is a top schematic view of a spin stand testing system 100 configured to obtain accurate test measurements involving aggressor tracks written on a disk in accordance with one embodiment of the invention. The spin stand testing system 100 includes a disk 102 and a positioning device 104. The disk 102 is representative of a magnetic recording disk that would be used in a hard disk drive and is configured to rotate around an axis at a variable rotation rate. The positioning device 104 secures a head gimbal assembly (HGA) 106 that includes a head 108. The HGA 106 also includes a microactuator 109 that is configured to laterally translate a read sensor of the head 108, for instance, by translating the entire head 108 as shown, or by translating just a transducer of the head 108 that includes the read sensor.

The positioning device 104 is configured to position the head 108 to a desired position on the disk 102, for example, with a combination of coarse and fine positioners for translating the HGA 106. As shown in FIG. 1, the positioning device 104 includes both coarse and fine positioners. The coarse positioning of the head 108 is performed by two platforms on orthogonal rail systems, while the fine positioning is performed by a secondary mover 122.

Turning first to the coarse positioners, the HGA 106 is secured to a base 110 on a first platform 112. The first platform 112 includes a set of rails 114 upon which the base 110 can move back and forth in a first direction relative to the first platform 112. A motor (not shown) is one example of a mechanism for driving the base 110 relative to the first platform 112. Similarly, the positioning device 104 also has a second platform 116 including a set of rails 118. In this embodiment the first platform 112 is configured to move upon the rails 118 relative to the second platform 116 in a second direction.

By moving the base 110 relative to the first platform 112, and by moving the first platform 112 relative to the second platform 116, the head 108 can be positioned at a desired disk radius, r, and skew angle, a (an angle formed between a longitudinal axis of the HGA 106 and a tangent to a radial line through the head 108). It will be appreciated, however, that various types of coarse positioning means, and not just that employed by the positioning device 104 to move the base 110 relative to the disk 102, may be used in accordance with embodiments of the invention.

In addition to the orthogonal rail system for coarse positioning, the positioning device 104 also includes the secondary mover 122. The secondary mover 122 provides a finer positioning capability in a lateral direction than is provided by the orthogonal rail system. The secondary mover 122 provides fine positioning, for example, through the use of an actuator based on a piezoelectric material. Preferably, the secondary mover 122 is able to move the head 108 in steps that are on the order of a micro-inch or less.

The positioning device 104 further includes a processor 124 that may be electrically coupled to the head 108, the microactuator 109, the secondary mover 122, and the coarse and fine positioners. The processor 124 can include a memory configured to store information such as instructions to be executed on the processor 124 or other information. In some embodiments, the memory is integrated with processor 124. In other embodiments, the memory is not integrated with processor 124. The processor 124 is configured to execute instructions for operating the spin stand testing system 100.

In this context, the processor 124 refers to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, and other such terms, refer to any type of logic or circuitry capable of executing logic, commands, instructions, software, firmware, functionality, or other such information.

Figure 2:
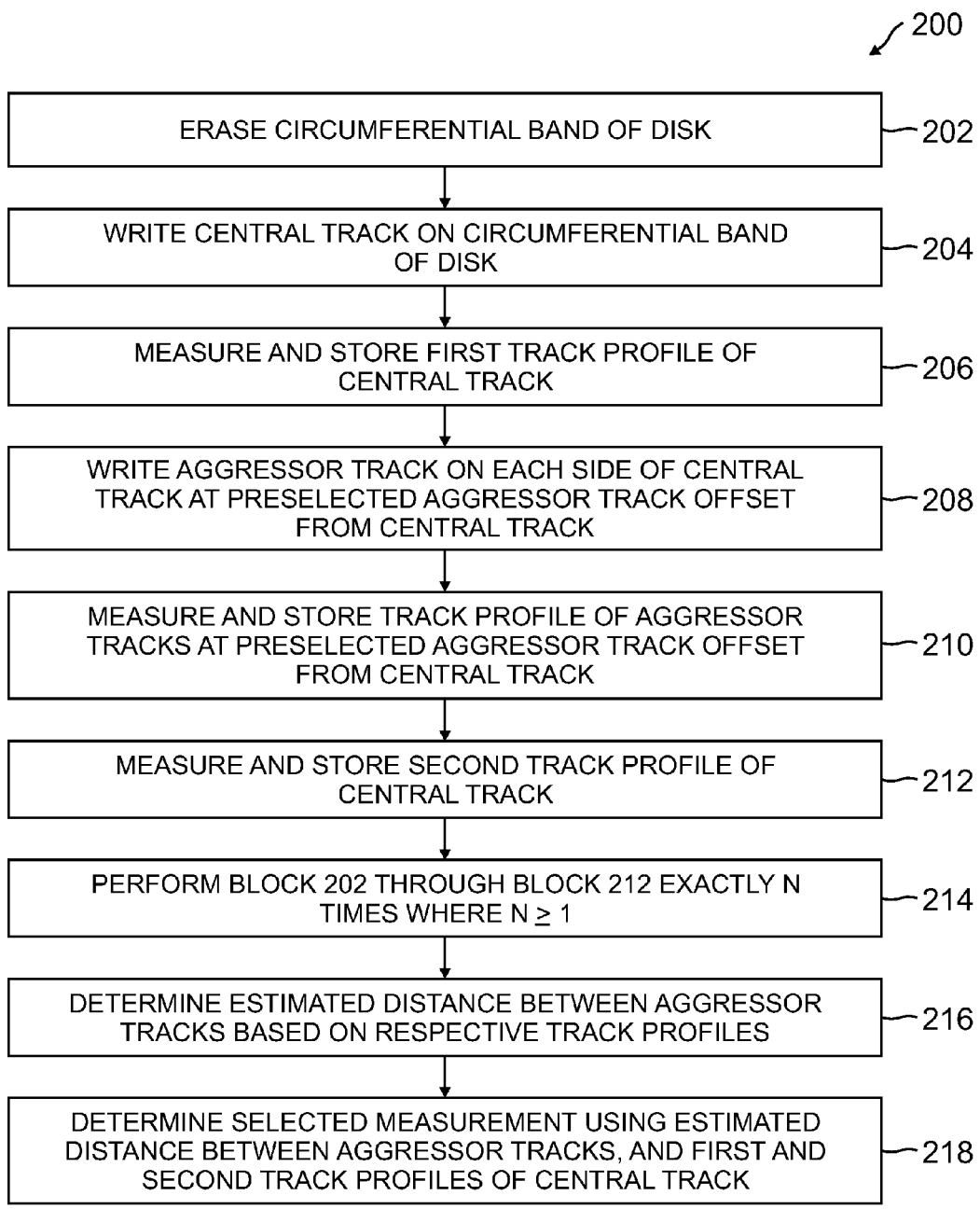
FIG. 2 is a flow chart of a process for obtaining accurate test measurements involving aggressor tracks written on a disk in accordance with one embodiment of the invention.

FIG. 2 is a flow chart of a process 200 for obtaining accurate test measurements involving aggressor tracks written on a disk in accordance with one embodiment of the invention. In particular embodiments, the process 200 can be executed on the spin stand test system 100 of FIG. 1, and more specifically, on the processor 124 of FIG. 1.

FIG. 2—Block 202:
The process first erases a circumferential band of a disk in block 202. In several embodiments, the process can erase a range of write offsets to be used in the process.

FIG. 2—Block 204:
The process then writes a central track on the circumferential band of the disk in block 204.

FIG. 2—Block 206:
The process then measures and stores a first track profile of the central track in block 206. In several embodiments, the process measures the amplitude as a function of radial offset at the central track to generate the first track profile of the central track.

FIG. 2—Block 208:
The process then writes an aggressor track on each side of the central track at a preselected aggressor track offset from the central track in block 208. In some embodiments, the process generates a list of off-track positions where the aggressor tracks will be written on each side of the central track. In one such embodiment for a squeeze measurement, two additional off-track locations are used on each side in addition to the location where the first aggressor track is intended to be written. For example, if squeeze is desired for aggressor tracks located at plus and/or minus a preselected desired offset (e.g., aggressor_offset0) from the central track location, the three values on one side will be offset1, offset2, and offset3, which are equal to <aggressor_offset0> plus or minus Npos multiplied by (piezo actuator step size) where Npos is an integer and <aggressor_offset0> is the discretized version of aggressor_offset0 in units of the piezo actuator step size. Similarly, the off-track locations for aggressors on the other side will be offset4, offset5, and offset6, which are equal to negative <aggressor_offset0> plus or minus Nneg multiplied by (piezo actuator step size), where Nneg is an integer.

In some embodiments, the process writes the aggressor tracks only to preselected sectors of the disk in block 208. In such case, the process can generate a list of preselected sectors for aggressor tracks and associate the sectors with the off-track locations for aggressor tracks. Examples of sector layouts that can be used are shown in FIG. 3 and FIG. 4.

Figure 3:
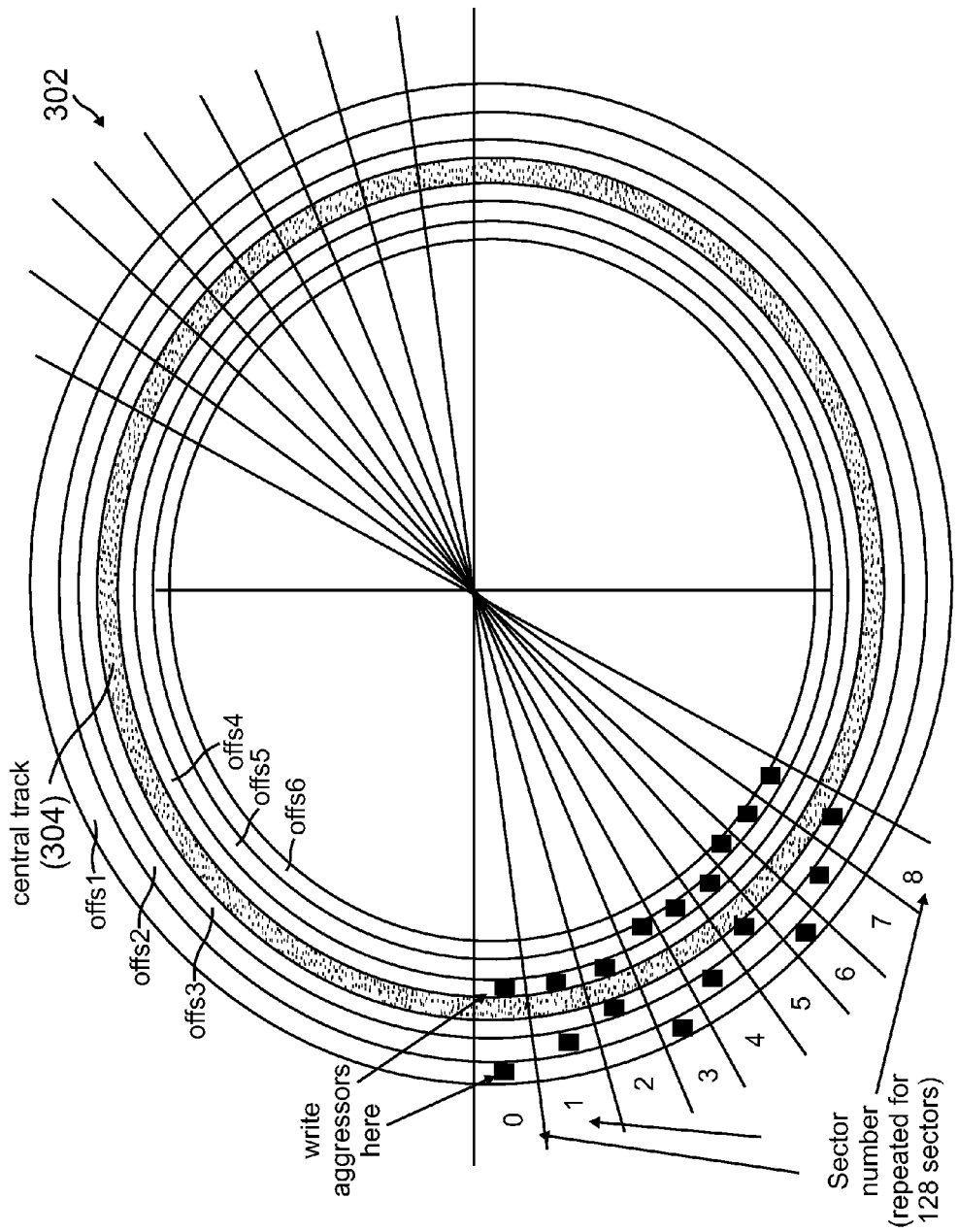
FIG. 3 is a top schematic view of a disk having a central test track written initially and aggressor tracks written adjacent to the central track later, where the disk has been divided into sectors to increase process efficiency, in accordance with one embodiment of the invention.

FIG. 3 is a top schematic view of a disk 302 having a central test track 304 written initially and aggressor tracks (offs1, offs2, offs3, offs4, offs5, offs6) written adjacent to the central track 304 in select sectors later, where the disk has been divided into sectors (only 0 to 8 shown) to increase process efficiency, in accordance with one embodiment of the invention. In several embodiments, the disk 302 is divided up into about 128 sectors.

Figure 4:
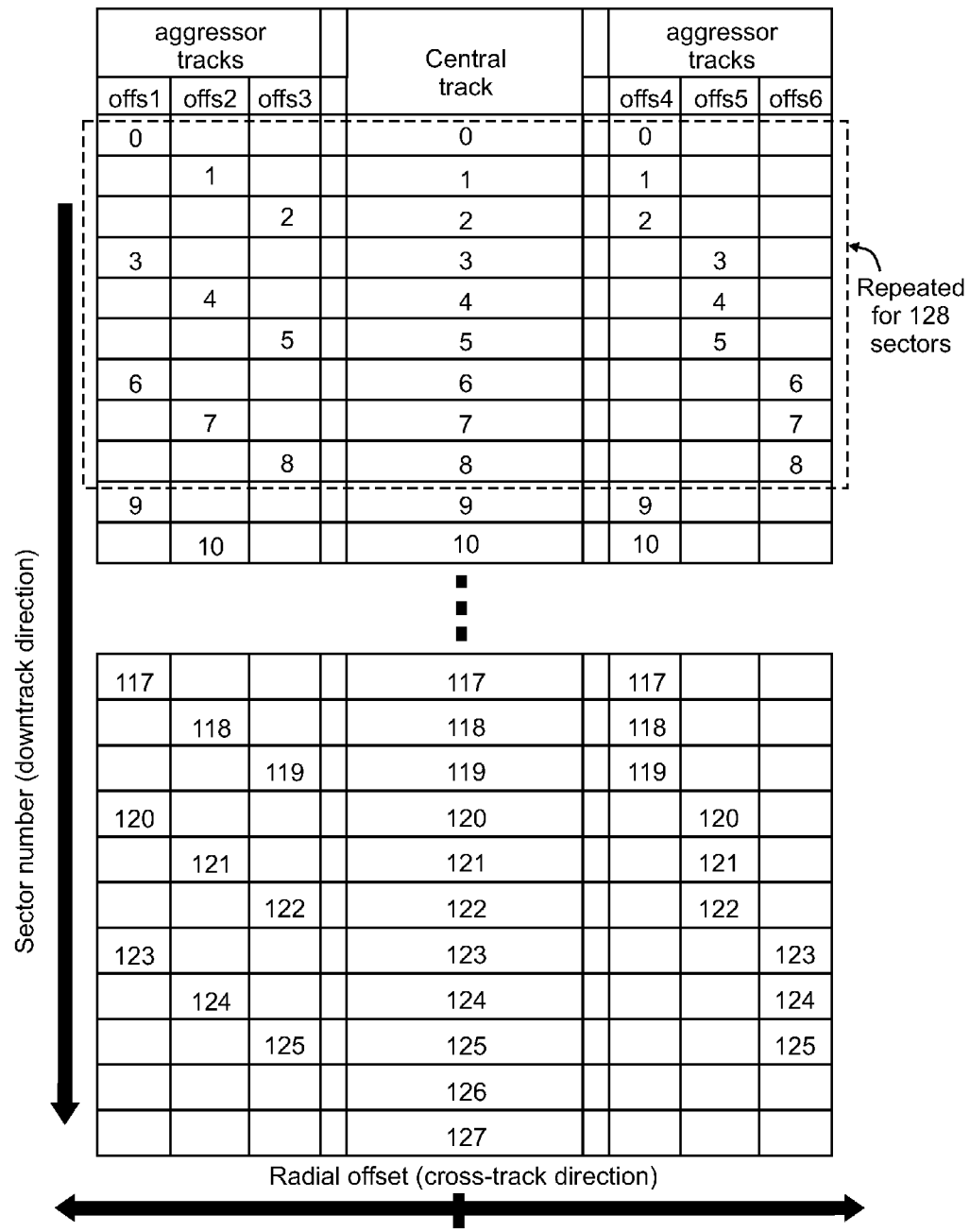
FIG. 4 is a table illustrating disk sectors numbers and radial offsets for a central test track and various aggressor tracks written at preselected offset positions relative to the central track in accordance with one embodiment of the invention.

FIG. 4 is a table illustrating disk sectors numbers (0 to 127) and radial offsets for a central test track and various aggressor tracks written at preselected offset positions (offs1, offs2, offs3, offs4, offs5, offs6) relative to the central track in accordance with one embodiment of the invention. In several embodiments, the sectors, radial offsets and central track of FIG. 4 corresponds to those of FIG. 3. In FIG. 4, the aggressor track at offset "offs1" is written in sectors 0, 3, 6, 9, etc. Writing the aggressors at three radial locations on each side of the center track creates 3 by 3 squeeze configurations (e.g., nine possible combinations of aggressor track locations). One goal of the sector allocation is to maintain the independence of the nine squeeze measurements without making the measurement impractical from a test time point of view. In FIG. 4, the aggressor tracks are written at three off-track locations on the left side (offs1, offs2, offs3) and at three off-track locations on the right side (offs4, offs5, offs6). This sector allocation scheme (e.g., the one from sectors 0 to 8) is repeated in the downtrack direction until all the sectors in a revolution are filled. When reading the central track after the aggressor writes, certain sectors are associated with certain off-track aggressor write locations.

FIG. 2—Block 210:

Returning now to FIG. 2, the process then measures and stores a track profile of the aggressor tracks at the preselected aggressor track offset from the central track in block 210. In some embodiments, the process writes the aggressor tracks only to preselected sectors of the disk in block 208. In such case, the process measures and stores the track profile of the aggressor tracks at the preselected aggressor track offsets from the central track in the preselected sectors of the disk in block 210. In one such case, see for example the sectors of FIG. 4, the process also selects the preselected aggressor track offsets and the preselected sectors such that for a preselected group of the preselected sectors, each combination of the preselected aggressor track offsets for a particular sector are unique. In one embodiment, the preselected group of the preselected sectors is about 9 sectors (see for example sectors 0 to 8 in FIG. 4). In several embodiments, the sector combinations present in the preselected group of 9 sectors can be repeated for every 9 sectors up to sector 127 of the disk.

In several embodiments, the process measures and stores the track profile of the aggressor tracks at the preselected aggressor track offset from the central track in block 210 by performing a servo calibration procedure and thereby generating a read offset correction table, and applying the read offset correction table to the track profiles of the aggressor tracks thereby generating corrected track profiles of the aggressor tracks, where the process then determines the estimated distance between the aggressor tracks based on the respective track profiles based on the respective corrected track profiles in block 216, to be discussed in more detail below. In one such embodiment, the process performs the servo calibration procedure by writing a series of tracks over a range of read offsets to be calibrated, measuring a set of raw track profiles from the series of tracks, sampling the set of raw track profiles at a series of signal amplitude levels, constructing a reference track profile from the set of sampled track profiles, calculating a set of read offset deltas from each sampled track profile, and merging the sets of read offset deltas into a set of average read offset deltas stored in the read offset correction table. More details on the server calibration procedure can be found in U.S. patent application Ser. No. 13/115,307, entitled, "SYSTEM AND METHOD FOR IMPROVING HEAD POSITIONING", the entire content of which is incorporated herein by reference. In some embodiments, the process performs the servo calibration procedure prior to erasing the circumference band of the disk in block 202.

FIG. 2—Block 212:

The process then measures and stores a second track profile of the central track in block 212. In several embodiments, the process generates a list of sectors for reading back the center track after the aggressor writes. For example and in reference to table of FIG. 4, to assess the damage created by the aggressor at offs1 (sectors 0, 3, 6, 9, . . . ) and the corresponding damage at offs4 (sectors 0, 1, 2, 9, 10, 11, . . . ), the algorithm can use the common sectors (0, 9, 18, . . . ). Similarly, to assess the damage created by the aggressor at offs1 (sectors 0, 3, 6, 9, . . . ) and the corresponding damage at offs5 (sectors 3, 4, 5, 12, 13, 14, . . . ), the algorithm can use the common sectors (3, 12, 21, . . . ).

FIG. 2—Block 214:

The process then performs blocks 202 through 212 exactly n times where n is greater than or equal to 1 in block 214. In one embodiment, n is greater than or equal to 2. In another embodiment such as that illustrated in FIG. 4, n is equal to or greater than 3 such that at least 3 iterations of blocks 202 through 212 are performed. In such case, the process can write aggressor tracks to the preselected sectors such that the process writes 1 sector for every 3 consecutive sectors on a first side of the central track, writes 3 consecutive sectors for every 9 consecutive sectors on a second side of the central track, and performs these two sector writes exactly 3 times at 3 different preselected aggressor track offsets. In one such case, the process can repeat these actions until all sectors around the disk have been written with the aggressor tracks. In other embodiments, other sector selection techniques can be used for choosing the sectors to write the aggressor tracks.

FIG. 2—Block 216:

The process then determines an estimated distance between the aggressor tracks based on the respective track profiles in block 216. In one embodiment, the process is applied for a squeeze measurement. In such case and in order to obtain the dependence of squeeze on the aggressor distance, an accurate assessment of the distance between aggressor tracks is needed. This goal can be achieved in two steps. First, the aggressor tracks are measured by means of track profiles in particular sectors established in the discussion of block 208 above. In one aspect, three track profiles (TPN1, TPN2, TPN3) are obtained at negative offsets, representing the aggressor tracks written at offs1, offs2, offs3, respectively, and similarly three track profiles (TPP1, TPP2, TPP3) are obtained at the positive offsets, representing the aggressor tracks written at offs4, offs5, offs6, respectively. An example of such measured track profiles is shown in FIG. 5.

Figure 5:
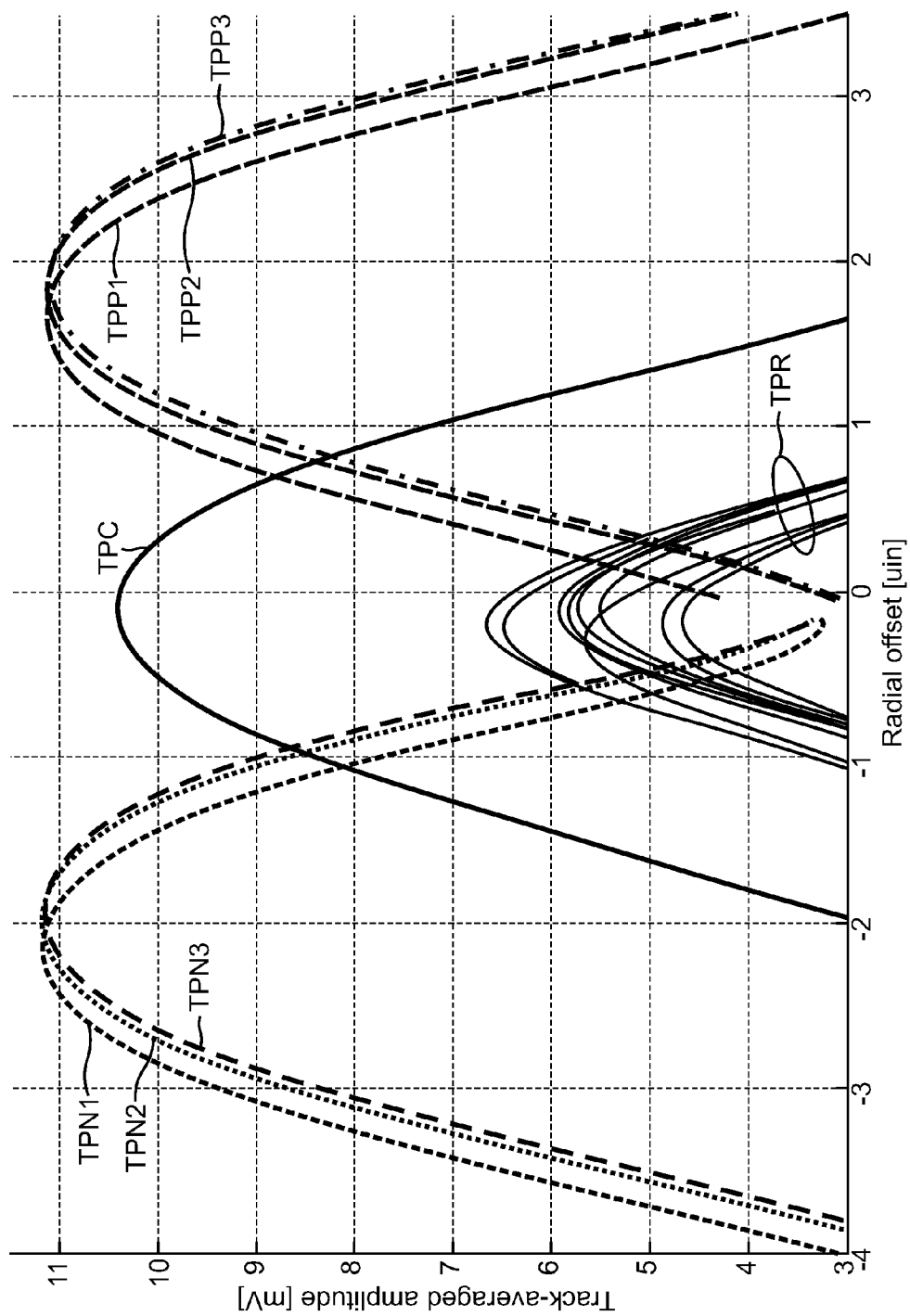
FIG. 5 is a graph illustrating an example of measured track profiles including an original central test track, residual tracks, and aggressor tracks in accordance with one embodiment of the invention.

FIG. 5 is a graph illustrating an example of measured track profiles including an original central test track (TPC), residual tracks (TPR), and aggressor tracks (TPN1, TPN2, TPN3, TPP1, TPP2, TPP3) in accordance with one embodiment of the invention. The vertical axis shows the track-averaged amplitude in millivolts (mV), and the horizontal axis shows the radial offset in micro-inches (uin). On each side of the center track the aggressor tracks are written in different sectors and at different off-track locations. The positioning of the aggressor tracks at multiple locations results in residual center profiles (TPR) with various peak amplitudes and central locations. One feature related to aspects of this novel process involves the observation that conventional techniques rely on either raw or numerically corrected off-track positions reported by the piezo actuator, whereas the present techniques can measure the actual location where the aggressors tracks have been written, thus reducing both the repeatable (systematic) and non-repeatable (non-systematic) radial positioning errors.

The process can estimate the distance between the aggressors located on opposite sides with respect to the central track by using the measured track profiles and the servo correction function for read offsets (determined in block 210).

The servo correction function for read offsets is used to correct the track profiles of the aggressor tracks such that TPN1, TPN2, TPN3 are converted to corrTPN1, corrTPN2, corrTPN3. The corrected track profiles from the negative offset side, corrTPN1,2,3, are paired with those from the positive side, corrTPP1,2,3, to calculate the distance between them where the aggressor distance (i,j) or "aggr_disti,j" is equal to the distance between (corrTPNi, corrTPPj). Several techniques can be used to calculate the distance between two track profiles. In one embodiment, for example, the process can use the algorithm implemented in the U.S. patent application Ser. No. 13/115,307, incorporated by reference above, where the two aggressor tracks are re-sampled at equal values of amplitude and numerically offset-shifted to find the optimal overlap of the track profiles in a least-squares sense. In other embodiments, other suitable techniques can be used.

With the squeeze measurement values determined in block 212 and the aggressor distances estimated in block 216, the process can provide the dependence of a squeeze measurement on the aggressor distance, or Squeeze(aggr_disti,j). In one aspect, this dependence is linear for the range of parameters that are typically used in head/media testing. The slope and intercept of the Squeeze(aggr_disti,j) can be used to calculate squeeze at the desired aggressor_offset0, thus overcoming issues caused by the finite radial step size of the piezo actuator described above. This is another feature of the present process that allows the user to overcome the hardware limitation associated with the finite step size of the radial positioning system. An example of Squeeze(aggr_disti,j) dependence is shown in FIG. 6.

Figure 6:
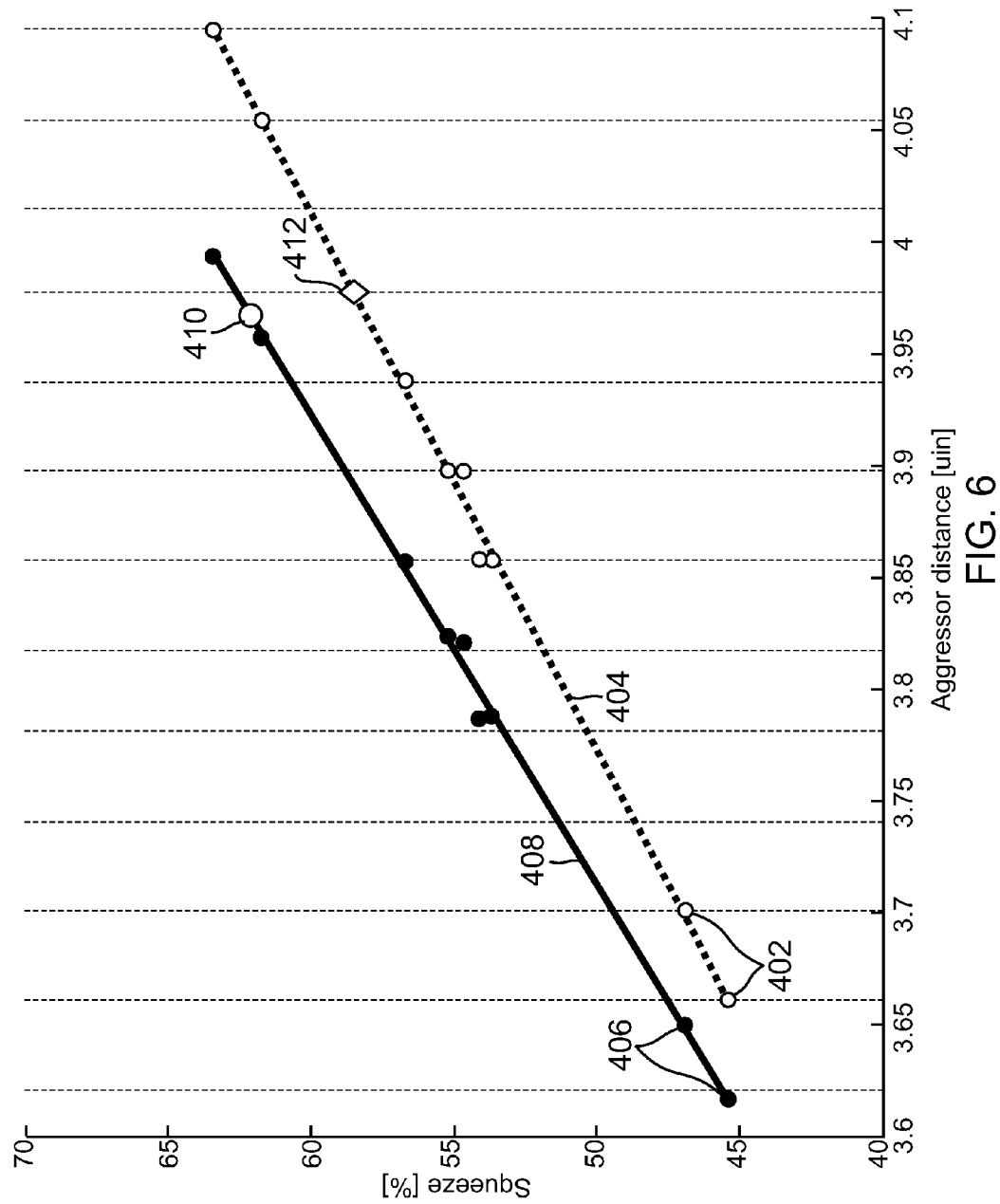
FIG. 6 is a graph illustrating a squeeze test measurement as a function of the distance between aggressor tracks in accordance with one embodiment of the invention.

FIG. 6 is a graph illustrating a squeeze test measurement as a function of the distance between aggressor tracks in accordance with one embodiment of the invention. The vertical axis represents squeeze in percent, and the horizontal axis represents the aggressor distance in uin. The vertical grid lines represent radial offsets that are accessible to the piezo actuator (integer multiples of the step size). As described above for one exemplary embodiment, the three aggressor tracks on each side of the central track can result in nine values of aggressor distance. In the absence of any servo correction, the aggressor distances reported back by the piezo actuator are multiples of its finite step size (e.g., circular points 402 along lower line 404), as opposed to the more accurate values which are estimated by embodiments of the present algorithm (e.g., circular points 406 along upper line 408). The novel processes described herein can report a squeeze measurement value interpolated from the linear dependence at the desired aggressor distance (e.g., larger circular point 410) which is in stark discrepancy with the raw squeeze measurement value (e.g., diamond shaped point 412).

FIG. 2—Block 218:

Returning now to FIG. 2, the process then determines a selected measurement using the estimated distance between the aggressor tracks, and the first and second track profiles of the central track in block 218. In several embodiments, the determination of the selected measurement involves interpolation of measurement data.

In several embodiments, each of the preselected aggressor track offsets from the central track is different for each iteration of the process such that each is unique (e.g., organized to maximize the number of unique track separations).

In several embodiments, track profiles of the central track and/or aggressor tracks can be measured and stored. The track profiles can be thought of as a set of data reflecting the measuring and storing of an amplitude over a preselected radial offset range including the track of interest (e.g., central track or aggressor track).

In some embodiments, the process is performed using a spin stand device such as the one described above and depicted in FIG. 1. In other embodiments, the process may be performed by a hard disk drive as part of a testing sequence. In other embodiments, the process may be performed by other suitable disk testing equipment.

In several embodiments, the process is configured to determine the selected measurement as a squeeze measurement. In other embodiments, the selected measurement is a magnetic track width measurement, a signal to noise ratio measurement, an error margin measurement, a shingled error margin measurement, and/or another measurement that involves writing one or more aggressor tracks adjacent to a central track on a disk.

In several embodiments, the preselected measurement offset is a non-integer multiple of a minimum piezo-step size of a servo sub-component of a test instrument performing the writing the aggressor tracks on each side of the central track. In such case, the process can allow measurements to be made, often by way of interpolation, at locations that a spin stand or other disk testing machine cannot actually write directly to, or measure directly from.

In some embodiments, the process repeatedly writes the aggressor tracks on each side of the central track at the preselected aggressor track offset from the central track for a preselected number of iterations in block 208. In one embodiment, the preselected number of iterations is about 1 iterations (e.g., for a squeeze measurement). In another embodiment, the preselected number of iterations can be 3, 10, 100, 300, 1000, or 5000 iterations depending on the type of measurement value desired.

In one embodiment, the process 200 can perform the sequence of actions in a different order. In another embodiment, the process can skip one or more of the actions. In other embodiments, one or more of the actions are performed simultaneously. In some embodiments, additional actions can be performed.

In several embodiments, the process can seek to avoid duplicate data. For example, for the case when Npos is equal to Nneg which is also equal to N (see block 208 of the process where sectors are selected for aggressor tracks, and for example equal separations of offsets of sectors 0, 4, 8 in FIG. 4 where only one separation would represent particularly valuable data while the other two might be redundant) the list of aggressor distances in raw, uncorrected units contains duplicates:

3 times: 2*<aggressor_offset0>
2 times: 2*<aggressor_offset0>+N*(piezo actuator step size)
2 times: 2*<aggressor_offset0>−N*(piezo actuator step size)
1 time: 2*<aggressor_offset0>−2*N*(piezo actuator step size)
1 time: 2*<aggressor_offset0>+2*N*(piezo actuator step size)

To avoid this scenario, a non-symmetrical configuration (e.g., where Npos is not equal to Nneg) can be used in measurements on the spinstand. One additional benefit of the non-symmetrical configuration is that the range of aggressor distances becomes wider, and thus the linear fit Squeeze (aggr_disti,j) is more reliable. An example of such data in shown in FIG. 7. The data shows that for one experimental spinstand tester, heads and media, any radial mis-positioning of the aggressor track writes of about plus or minus 0.04 uin (which is the radial step size of the hardware used in an experiment responsible for the data of FIG. 7) results in a squeeze error of about plus or minus 2%.

In several embodiments, the processes and test configurations described herein provide a number of advantages. For example, the processes and test configurations can improve the repeatability of spinstand measurements (e.g., squeeze measurements) over several servo writes by accurately determining where the aggressor tracks have been written. In one aspect, the processes and test configurations do not require additional hardware. In addition, the processes and test configurations can circumvent the hardware limitation imposed by the finite step size of the piezo actuator. The processes and test configurations can also be extended to more complex measurements such as wsSNR and Error Rate/Error Margin with aggressor writes.

To assess some of the benefits of the proposed technique, several sets of measurements have been performed on a commercial Guzik spinstand tester. After writing a servo pattern, ten consecutive measurements were performed with the same testing conditions. A new servo was written and the procedure was repeated. In the end, a total of 100 measurements were performed, with ten new servo writes and ten measurements for each servo write. The goal of this procedure was to assess the repeatability of the measurements. An example of such data which were acquired is shown in FIG. 7.

Figure 7:
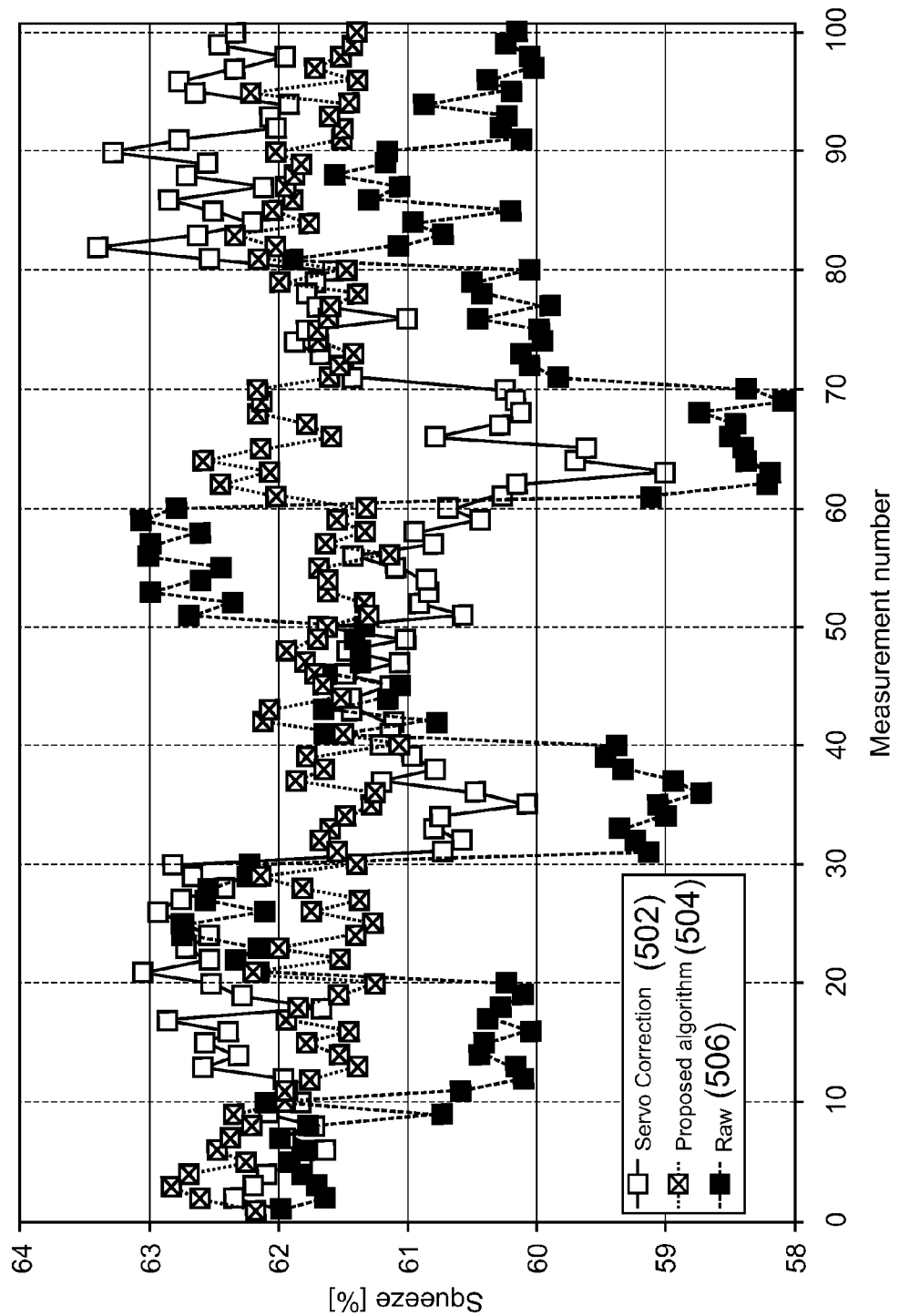
FIG. 7 is a graph illustrating squeeze test measurement data acquired on a commercial spinstand in a series of repeated measurements with ten servo writes in accordance with one embodiment of the invention.

FIG. 7 is a graph illustrating squeeze test measurement data acquired on a commercial spinstand in a series of repeated measurements with ten servo writes (vertical dashed lines) in accordance with one embodiment of the invention. The vertical axis represents squeeze in percent, and the horizontal axis represents the measurement number. As can be seen in FIG. 7, the data acquired with the servo correction algorithm 502 significantly reduces the scatter in the raw data 506. In addition, the algorithm presented in this application 504 provides the best repeatability of the data. The new algorithm 504 reduces not only the overall data scatter (servo write to servo write) but also the data scatter within a servo write.

The raw data 506, which were measured without enabling the servo correction algorithm, exhibit a significant scatter due to the systematic and non-systematic errors that affect the radial positioning system. The implementation of the servo correction algorithm decreases the data scatter by reducing the systematic errors. However, it appears that the servo correction algorithm cannot reduce the non-systematic errors. The range of squeeze values is larger than about 4%, which is associated with about plus or minus 0.04 uIn (corresponding to about plus or minus 1 nanometer or nm) radial positioning error. The proposed algorithm reduces even further the systematic errors due to the inaccuracies of the servo pattern, as shown in FIG. 7. The range of Squeeze values reported by the proposed algorithm is below about 2%, which is associated with about plus or minus 0.02 uIn (plus or minus 0.5 nm) radial positioning error. Squeeze ranges smaller than 2% have been consistently observed in a number of experiments, also at other radii than a midpoint.

In one aspect, a penalty of the proposed algorithm can be the test time. In some embodiments, for example, the aggressors are written at more than one location on each side of the central track, and the aggressor tracks are profiled, such that the testing time is higher compared to a conventional squeeze algorithm. However, the use of particular sectors can reduce the testing time.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

For example, in several embodiments, the methods described herein can be used to improve disk media characterization of magnetic disks used in hard disk drives. However, in other embodiments, the methods described herein can be used to improve spinstand testing of other devices under test.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method for improving measurements involving aggressor tracks, the method comprising:
   (a) erasing a circumferential band of a disk;
   (b) writing a central track on the circumferential band of the disk;
   (c) measuring and storing a first track profile of the central track;
   (d) writing an aggressor track on each side of the central track at a preselected aggressor track offset from the central track;
   (e) measuring and storing a track profile of the aggressor tracks at the preselected aggressor track offset from the central track;
   (f) measuring and storing a second track profile of the central track;
   performing (a) through (f) exactly n times where n is greater than or equal to 1;
   determining an estimated distance between the aggressor tracks based on the respective track profiles; and
   determining a selected measurement using the estimated distance between the aggressor tracks, and the first and second track profiles of the central track.

2. The method of claim 1:
   wherein n is greater than or equal to 2;
   wherein for each iteration of (a) through (f) of the method, the preselected aggressor track offset from the central track is unique; and
   wherein the determining the selected measurement using the estimated distance between the aggressor tracks, and the first and second track profiles of the central track comprises determining the selected measurement at a preselected offset from the central track using interpolation, the estimated distance between the aggressor tracks for each iteration, and the first and second track profiles of the central track.

3. The method of claim 2:
   wherein the (d) writing the aggressor track on each side of the central track at the preselected aggressor track offset from the central track comprises writing the aggressor track on each side of the central track at the preselected aggressor track offset from the central track in preselected sectors of the disk; and wherein the (e) measuring and storing the track profile of the aggressor tracks comprises measuring and storing the track profile of the aggressor write tracks at the preselected aggressor track offset from the central track and the preselected sectors of the disk.

4. The method of claim 3, further comprising selecting the preselected aggressor track offsets and the preselected sectors such that for a preselected group of the preselected sectors, each combination of the preselected aggressor track offsets for a particular sector are unique.

5. The method of claim 4, wherein n is equal to or greater than 3 such that at least 3 iterations of (a) through (f) are performed.

6. The method of claim 5, wherein the preselected group of the preselected sectors is 9 sectors.

7. The method of claim 6, wherein the writing the aggressor track on each side of the central track at the preselected aggressor track offset from the central track in preselected sectors of the disk comprises:

(g) writing 1 sector for every 3 consecutive sectors on a first side of the central track;

(h) writing 3 consecutive sectors for every 9 consecutive sectors on a second side of the central track; and performing (g) and (h) exactly 3 times at 3 different preselected aggressor track offsets.

8. The method of claim 1, wherein for each iteration of (a) through (f) of the method, the preselected aggressor track offset from the central track is unique.

9. The method of claim 1, wherein n is equal to or greater than 3 such that at least 3 iterations of (a) through (f) are performed.

10. The method of claim 1:

wherein the measuring and storing the first track profile of the central track comprises measuring and storing an amplitude over a preselected radial offset range comprising the central track; and wherein measuring and storing the track profile of the aggressor tracks at the preselected aggressor track offset from the central track comprises measuring and storing an amplitude over a preselected radial offset range comprising a respective one of the aggressor tracks.

11. The method of claim 1:

wherein the (e) measuring and storing the track profile of the aggressor tracks at the preselected aggressor track offset from the central track comprises:

performing a servo calibration procedure and thereby generating a read offset correction table; and applying the read offset correction table to the track profiles of the aggressor tracks thereby generating corrected track profiles of the aggressor tracks, and wherein the determining the estimated distance between the aggressor tracks based on the respective track profiles comprises determining the estimated distance between the aggressor tracks based on the respective corrected track profiles.

12. The method of claim 11, wherein the performing the servo calibration procedure and thereby generating the read offset correction table comprises:

writing a series of tracks over a range of read offsets to be calibrated;

measuring a set of raw track profiles from the series of tracks;

sampling the set of raw track profiles at a series of signal amplitude levels;

constructing a reference track profile from the set of sampled track profiles;

calculating a set of read offset deltas from each sampled track profile; and merging the sets of read offset deltas into a set of average read offset deltas stored in the read offset correction table.

13. The method of claim 1, wherein the method is performed using a test instrument selected from the group consisting of a spin stand and a hard disk drive.

14. The method of claim 1, wherein the selected measurement is selected from the group consisting of a squeeze measurement, a magnetic track width measurement, a signal to noise ratio measurement, an error margin measurement, a shingled error margin measurement, and combinations thereof.

15. The method of claim 1, wherein the preselected measurement offset comprises a non-integer multiple of a minimum piezo-step size of a servo of a test instrument performing the writing the aggressor track on each side of the central track.

16. The method of claim 1, wherein the writing the aggressor track on each side of the central track at the preselected aggressor track offset from the central track comprises repeatedly writing the aggressor tracks on each side of the central track at the preselected aggressor track offset from the central track for a preselected number of iterations.

17. A system for improving measurements involving aggressor tracks, the system comprising:

a test platform configured to receive, support, and rotate a disk configured for magnetic information storage;

a magnetic transducer configured to write to, and read from, the disk;

a memory;

a processor coupled to the memory, the magnetic transducer, and the test platform, the processor configured to:

(a) erase a circumferential band of a disk;

(b) write a central track on the circumferential band of the disk;

(c) measure and store a first track profile of the central track;

(d) write an aggressor track on each side of the central track at a preselected aggressor track offset from the central track;

(e) measure and store a track profile of the aggressor tracks at the preselected aggressor track offset from the central track;

(f) measure and store a second track profile of the central track;

perform (a) through (f) exactly n times where n is greater than or equal to 1;

determine an estimated distance between the aggressor tracks based on the respective track profiles; and determine a selected measurement using the estimated distance between the aggressor tracks, and the first and second track profiles of the central track.

18. The system of claim 17:

wherein n is greater than or equal to 2;

wherein for each iteration of (a) through (f), the preselected aggressor track offset from the central track is unique; and wherein the processor is further configured to determine the selected measurement at a preselected offset from the central track using interpolation, the estimated distance between the aggressor tracks for each iteration, and the first and second track profiles of the central track.

19. The system of claim 18:
wherein the processor is configured to write the aggressor track on each side of the central track at the preselected aggressor track offset from the central track in preselected sectors of the disk; and
wherein the processor is configured to measure and store the track profile of the aggressor tracks at the preselected aggressor track offset from the central track at the preselected sectors of the disk.

20. The system of claim 19, wherein the processor is further configured to select the preselected aggressor track offsets and the preselected sectors such that for a preselected group of the preselected sectors, each combination of the preselected aggressor track offsets for a particular sector are unique.

21. The system of claim 20, wherein n is equal to or greater than 3 such that at least 3 iterations of (a) through (f) are performed.

22. The system of claim 21, wherein the preselected group of the preselected sectors is 9 sectors.

23. The system of claim 22, wherein the processor is configured to write the aggressor track on each side of the central track at the preselected aggressor track offset from the central track in the preselected sectors of the disk by:
(g) writing 1 sector for every 3 consecutive sectors on a first side of the central track;
(h) writing 3 consecutive sectors for every 9 consecutive sectors on a second side of the central track; and
performing (g) and (h) exactly 3 times at 3 different preselected aggressor track offsets.

24. The system of claim 17, wherein for each iteration of (a) through (f), the preselected aggressor track offset from the central track is unique.

25. The system of claim 17, wherein n is equal to or greater than 3 such that at least 3 iterations of (a) through (f) are performed.

26. The system of claim 17:
wherein the processor is configured to measure and store the first track profile by measuring and storing an amplitude over a preselected radial offset range comprising the central track;
wherein the processor is configured to measure and store the track profile of the aggressor tracks by measuring and storing an amplitude over a preselected radial offset range comprising a respective one of the aggressor tracks.

27. The system of claim 17:
wherein the processor is further configured to:
perform a servo calibration procedure and thereby generating a read offset correction table;
apply the read offset correction table to the track profiles of the aggressor tracks thereby generating corrected track profiles of the aggressor tracks; and
determine the estimated distance between the aggressor tracks based on the respective corrected track profiles.

28. The system of claim 27, wherein the processor is further configured to:
write a series of tracks over a range of read offsets to be calibrated;
measure a set of raw track profiles from the series of tracks;
sample the set of raw track profiles at a series of signal amplitude levels;
construct a reference track profile from the set of sampled track profiles;
calculate a set of read offset deltas from each sampled track profile; and
merge the sets of read offset deltas into a set of average read offset deltas stored in the read offset correction table.

29. The system of claim 17, wherein the system comprises a test instrument selected from the group consisting of a spin stand and a hard disk drive.

30. The system of claim 17, wherein the selected measurement is selected from the group consisting of a squeeze measurement, a magnetic track width measurement, a signal to noise ratio measurement, an error margin measurement, a shingled error margin measurement and combinations thereof.

31. The system of claim 17, wherein the preselected measurement offset comprises a non-integer multiple of a minimum piezo-step size of a servo of a test instrument performing the writing the aggressor track on each side of the central track.

32. The system of claim 17, wherein the processor is configured to repeatedly write the aggressor tracks on each side of the central track at the preselected aggressor track offset from the central track for a preselected number of iterations.

* * * * *